Patented June 21, 1949

2,473,911

UNITED STATES PATENT OFFICE 2,473,911

PRODUCTION OF FLUOROCARBONS

Norman Francis Sarsfield, Runcorn, England, assignor to Imperial Chemical Industries Limited, a corporation of Great Britain No Drawing. Application June 14, 1944, Serial No. 540,309. In Great Britain July 19, 1943

8 Claims. (Cl. 260—648)

This invention relates to improvements in the production of fluorocarbons.

It is known that fluorocarbons, i. e. fluorinated derivatives of hydrocarbons in which all the hydrogen atoms are replaced by fluorine atoms, can be prepared from hydrocarbons or fluorohydrocarbons, (i. e. partially fluorinated hydrocarbons) by reaction in the vapour phase with cobalt trifluoride. Alternatively such compounds may be reacted with fluorine, diluted with an inert gas, in the presence of a catalyst for the reaction such as silver-plated copper maintained at temperatures of, say, 100° C. to 250° C. In this specification and the claims, by "hydrocarbon" is meant only an open chain aliphatic or an uninuclear hydrocarbon. The normally liquid reaction products are then separated from inert gas and normally gaseous products by condensation. In these processes complex reactions may occur involving both cracking of the carbon chain and also condensations leading to the formation of longer carbon chains, while the replacement of hydrogen atoms by fluorine atoms does not always go to completion. There are thus present in the liquid reaction product both fluorocarbons and fluorohydrocarbons; some unchanged hydrocarbon is also usually present. The presence of the latter makes it impracticable to separate the fluorocarbons from each other and from the fluorohydrocarbons by distillation, since the hydrocarbon distils over with the lower-boiling fluorocarbons in spite of the difference in boiling points. For some purposes even quite small amounts of hydrocarbon or fluorohydrocarbon in the fluorocarbon may be deleterious; moreover, some decomposition of the fluorocarbon may occur during the distillation, probably due to impurities in the crude material. Thus on both accounts distillation does not give a satisfactory product.

According to the present invention a process for recovering fluorocarbons from a liquid mixture of one or more hydrocarbons with partially and completely fluorinated products thereof comprises contacting the mixture in the cold with a liquid which is a solvent for the hydrocarbons and which is substantially a non-solvent for the fluorocarbons at the temperature of extraction so as to extract the hydrocarbons, separating the fluorocarbon-containing layer from the solvent-containing layer, submitting the fluorocarbon layer to fractional distillation, and isolating at least one fluorocarbon fraction.

By this method of extracting the hydrocarbon constituents from the reaction products of fluorination processes, a mixture containing the fluorocarbons and fluorohydrocarbons is produced from which the former can be isolated by fractional distillation much more readily than hitherto; moreover, it is found that decomposition does not occur in the distillation of material treated in this way. Where, as a result of cracking or condensation, more than one fluorocarbon is present these can be obtained in separate fractions. The products so obtained are, in general, substantially free from hydrocarbon, but where small amounts are present, or where the required conditions of purity are exceptionally rigorous, the fractions may be submitted to a further treatment with a solvent to remove traces of the hydrocarbon.

Suitable solvents which may be used in the invention include the lower aliphatic alcohols, methyl alcohol, ethyl alcohol, propyl and isopropyl alcohol, butyl and isobutyl alcohol; the lower aliphatic ketones, acetone, methyl ethyl ketone and diethyl ketone may also be used. The process may, for example, be applied to the preparation of fluorocarbons from such starting materials as hexane, heptane, benzene, toluene, and mixtures thereof with each other or with their partially fluorinated derivatives.

Advantageously the solvent employed is one which is miscible with water. The extracted hydrocarbon may then also be recovered in a very convenient manner by diluting the extract with water so as to cause a separate layer to be formed consisting chiefly of the hydrocarbon, and then separating the hydrocarbon layer. The recovered hydrocarbon may, if desired, be dried and returned to the fluorination process, while the solvent may also be recovered from the water layer, as by distillation, and re-used.

When carrying out the process with an alcohol which is miscible with water, or which will dissolve a small amount of water, it is a further advantage to dissolve a small amount, for example 2% to 5%, of water in the first portion of alcohol used for the extraction to repress the solubility of the alcohol in the hydrocarbon-fluorohydrocarbon-fluorocarbon mixture, and thus to ensure that separate layers are formed. After the first extraction the special addition of water is not usually necessary, since the alcohols have a much lower solubility in the liquid after some fluorohydrocarbon has been extracted, although the presence of such water is not deleterious.

The partially fluorinated hydrocarbons present in the original mixture will be distributed between the fluorocarbon layer and the solvent during the extraction in a manner depending on the solvent selected and on the particular partially fluorinated hydrocarbon. In general, the fluorohydrocarbons are intermediate in solubility characteristics between the fluorocarbons and the hydrocarbons, but will, for the most part, remain in the fluorocarbon layer. Some may, however, be present in the solvent layer and such portion may be subsequently recovered, as by fractional distillation. In the preferred form of the invention in which a water-miscible solvent is employed which is subsequently diluted with water to cause a separate hydrocarbon layer to form, the partially fluorinated hydrocarbon which does pass into the solvent layer will separate with the hydrocarbon and may be recovered from it by fractional distillation. Alternatively, the mixture of hydrocarbon and fluorohydrocarbon may be returned directly to a fluorination process.

In one form of the invention a hydrocarbon, for example toluene, is vaporised, and the vapour, if desired after dilution with nitrogen, is mixed with fluorine, also diluted with nitrogen, so as to give a mixture containing a small excess of fluorine over hydrocarbon. The mixture is then passed through a copper or nickel reactor containing a silver-copper catalyst maintained between 100° C. and 250° C. The resulting normally liquid fraction of the reaction product is then condensed by cooling, and the condensate washed with aqueous alkali to remove hydrofluoric acid. Some normally gaseous material, for example carbon tetrafluoride, may also be formed and condensed separately or allowed to escape. The normally liquid fraction will consist of some unchanged toluene, partially fluorinated toluenes, completely fluorinated toluene ($C_7F_{14}$) and other fluorocarbons and fluorohydrocarbons resulting from side reactions involving both cracking of the toluene carbon skeleton, and also from condensation reactions between such cracked products and the toluene or between the products themselves. This liquid is then extracted several times, for example between 3 and 6 times, with about 20% of its volume of alcohol containing for example 1% to 2% water. After the extraction is complete the fluorocarbon layer is washed with water to remove alcohol, dried, for example over sodium, and then distilled so as to isolate the fraction consisting of completely fluorinated toluene. The combined alcohol extracts are then mixed with at least 5 times their volume of water and the resultant layer of toluene containing some of the partially fluorinated material is dried and used for further fluorination.

The following examples illustrate but do not limit the invention.

Example 1 n-Heptane vapour diluted with nitrogen was passed over a mass of cobalt trifluoride maintained between 350° C. and 400° C. The gases from the reaction chamber were delivered into a condenser maintained at −80° C., nitrogen and carbon tetrafluoride which remained uncondensed being allowed to escape. The liquid from the condenser, after being allowed to warm up to atmospheric temperature, was washed with water to remove dissolved hydrofluoric acid. The condensate was then washed four times with 20% of its volume of methylated spirits. The condensate layer from the extraction was dried over sodium and submitted to fractional distillation. A fraction consisting essentially of completely fluorinated heptane was obtained boiling at 82° C. to 83° C. in amount corresponding to a 24% yield, calculated on the heptane delivered to the reaction vessel.

Example 2

A mixture of n-heptane vapour with 10 times its volume of nitrogen and a slight excess of fluorine, was passed over a copper-silver catalyst maintained at 130° C. The normally liquid fraction in the gases was then recovered by condensation, washed with water and then with sodium carbonate solution to remove hydrofluoric acid. The condensate was then washed with 20% of its volume of methylated spirit, and the lower layer of product was then washed thoroughly with water, dried, and then distilled. Fluorocarbon was isolated boiling at atmospheric pressure in the range 82° C. to 83° C. in amount corresponding to 25% by weight of the crude product, or 20% of the heptane fed to the reaction vessel. In a comparison it was found that on distilling the condensate from the fluorination without extracting with methylated spirit the fraction boiling in the range 82° C. to 83° C. amounted to only 12½% of the crude product.

On drowning the combined methylated spirit extracts in water a layer of hydrocarbon and partially fluorinated hydrocarbon was obtained amounting to 25% of the crude product. After drying, this could be recycled with further quantities of heptane.

Example 3

A mixture of toluene vapour with 10 times its volume of nitrogen and a slight excess of fluorine was passed over a silver-copper catalyst maintained at 250° C. The normally liquid portion of the reaction product was condensed, washed first with water, and then with aqueous sodium carbonate solution to remove hydrofluoric acid. The condensate was then treated with 20% by volume of methylated spirit. Complete mixing of the two liquids occurred, but on adding water in amount corresponding to 25% by volume of the methylated spirit two layers formed and were separated. The lower condensate layer was washed three times with 20% by volume of methylated spirit (no water being now needed to keep the layers separated), then washed thoroughly with water, dried and distilled. Fluorocarbon boiling between 76° C. and 77° C. was obtained corresponding to 30% by volume of the original condensate and representing a 21% yield based on the hydrocarbon delivered to the reaction vessel.

On drowning the methylated spirit extracts in water, a separate layer of hydrocarbon and partially fluorinated hydrocarbon was obtained which could be recycled.

I claim:

1. A process for recovering fluorocarbon from a liquid mixture of at least one hydrocarbon with partially fluorinated and completely fluorinated products thereof which comprises extracting the hydrocarbon from the said mixture by contacting it in the cold with a solvent for the hydrocarbon selected from the group consisting of lower aliphatic alcohols and ketones, and subsequently submitting the mixture to fractional distillation so as to isolate at least one fluorocarbon fraction.

2. A process for recovering fluorocarbon from a liquid mixture of at least one hydrocarbon with partially fluorinated and completely fluorinated products thereof which comprises extracting the hydrocarbon from the mixture by contacting it in the cold with a lower aliphatic ketone, and subsequently submitting the mixture to fractional distillation so as to isolate at least one fluorocarbon fraction.

3. A process for recovering fluorocarbon from a liquid mixture of at least one hydrocarbon with partially fluorinated and completed fluorinated products thereof which comprises extracting the hydrocarbon from the mixture by contacting it in the cold with a lower aliphatic alcohol, and subsequently submitting the mixture to fractional distillation so as to isolate at least one fluorocarbon fraction.

4. A process for recovering fluorocarbon from a liquid mixture of at least one hydrocarbon with partially fluorinated and completely fluorinated products thereof which comprises extracting the hydrocarbon from the mixture by contacting it in the cold with a lower aliphatic alcohol having dissolved therein a small proportion of water, and subsequently submitting the mixture to fractional distillation, so as to isolate at least one fluorocarbon fraction.

5. A process for recovering fluorocarbon from a liquid mixture of at least one hydrocarbon with partially fluorinated and completed fluorinated products thereof which comprises extracting the hydrocarbon by contacting it in the cold with ethyl alcohol and subsequently submitting the mixture to fractional distillation so as to isolate at least one fluorocarbon fraction.

6. A process for recovering fluorocarbon from a liquid mixture of at least one hydrocarbon with partially fluorinated and completely fluorinated products thereof which comprises extracting the hydrocarbon by contacting it in the cold with ethyl alcohol having dissolved therein a small proportion of water and subsequently submitting the mixture to fractional distillation so as to isolate at least one fluorocarbon fraction.

7. A process for recovering fluorocarbon from a liquid mixture of at least one hydrocarbon with partially fluorinated and completely fluorinated products thereof which comprises extracting the hydrocarbon from the said mixture by contacting it in the cold with successive quantities of a lower aliphatic alcohol having dissolved therein a small proportion of water, and subsequently submitting the mixture to fractional distillation so as to isolate at least one fluorocarbon fraction.

8. A process for recovering fluorocarbon from a liquid mixture of at least one hydrocarbon with partially fluorinated and completely fluorinated products thereof which comprises extracting the hydrocarbon from the said mixture by contacting the latter in the cold with successive quantities of ethyl alcohol, the first quantity of which has dissolved therein a small proportion of water, and subsequently submitting the mixture to fractional distillation so as to isolate at least one fluorocarbon fraction.

NORMAN FRANCIS SARSFIELD.

REFERENCES CITED

The following references are of record in the file of this patent:

UNITED STATES PATENTS

| Number | Name | Date |
| --- | --- | --- |
| 2,005,709 | Daudt et al. | June 18, 1935 |
| 2,013,030 | Calcott et al. | Sept. 3, 1935 |
| 2,013,035 | Daudt et al. | Sept. 3, 1935 |
| 2,024,095 | Daudt et al. | Dec. 10, 1935 |
| 2,149,039 | Benning et al. | Feb. 28, 1939 |
| 2,228,791 | Soday | Jan. 14, 1941 |
| 2,275,151 | Kimberlin | Mar. 3, 1942 |
| 2,320,629 | Matuszak | June 1, 1943 |

OTHER REFERENCES

Gattermann, "Practical Methods of Organic Chemistry," 3rd ed. (1923), pp. 4–5.